United States Patent
Merienne

(10) Patent No.: US 10,337,604 B2
(45) Date of Patent: Jul. 2, 2019

(54) METHOD FOR CONTROLLING THE POSITION OF A GEARBOX ACTUATOR

(71) Applicant: Nissan Motor Co., Ltd., Yokohama-shi, Kanagawa (JP)

(72) Inventor: Ludovic Merienne, Gif sur Yvette (FR)

(73) Assignee: Nissan Motor Co., Ltd., Yokohama (JP)

( * ) Notice: Subject to any disclaimer, the term of this patent is extended or adjusted under 35 U.S.C. 154(b) by 35 days.

(21) Appl. No.: 15/740,238

(22) PCT Filed: Jun. 15, 2016

(86) PCT No.: PCT/FR2016/051438
§ 371 (c)(1),
(2) Date: Dec. 27, 2017

(87) PCT Pub. No.: WO2017/006005
PCT Pub. Date: Jan. 12, 2017

(65) Prior Publication Data
US 2018/0187775 A1   Jul. 5, 2018

(30) Foreign Application Priority Data
Jul. 7, 2015 (FR) .................... 15 56429

(51) Int. Cl.
*F16H 61/04* (2006.01)
*F16H 59/70* (2006.01)
*B60K 6/48* (2007.10)
*F16H 61/12* (2010.01)

(52) U.S. Cl.
CPC .............. *F16H 59/70* (2013.01); *B60K 6/48* (2013.01); *F16H 61/0403* (2013.01); *B60W 2510/0695* (2013.01); *B60Y 2200/92* (2013.01); *F16H 2061/0422* (2013.01); *F16H 2061/0474* (2013.01); *F16H 2061/1208* (2013.01); *F16H 2306/46* (2013.01); *Y10S 903/903* (2013.01)

(58) Field of Classification Search
CPC ................................................ F16H 2061/0422
See application file for complete search history.

(56) References Cited

U.S. PATENT DOCUMENTS

| | | | |
|---|---|---|---|
| 6,246,941 B1 | 6/2001 | Sayman | |
| 2002/0032100 A1 | 3/2002 | Walker | |
| 2013/0311027 A1* | 11/2013 | Toyota | ............... B60L 15/2054 701/22 |
| 2017/0274902 A1* | 9/2017 | Kumada | .................. H01M 8/04 |

FOREIGN PATENT DOCUMENTS

| | | |
|---|---|---|
| EP | 2690320 A2 | 1/2014 |
| FR | 2887495 A1 | 12/2006 |
| FR | 2917479 | 12/2008 |

* cited by examiner

Primary Examiner — Tisha D Lewis
(74) Attorney, Agent, or Firm — Global IP Counselors, LLP

(57) ABSTRACT

A method is provided for controlling the position of a gearbox actuator in charge of engaging a ratio at the end of a preliminary phase of synchronizing two shafts of the gearbox via a torque-driven traction machine to bring the speed difference of the two shafts within a range enabling the mechanical coupling thereof. The method ensures that the speed measured on one of the two shafts converges with a speed observed as a function of the inertia value observed on this shaft relative to the value expected as a function of the gearbox actuator, and of an estimation of the machine torque.

7 Claims, 5 Drawing Sheets

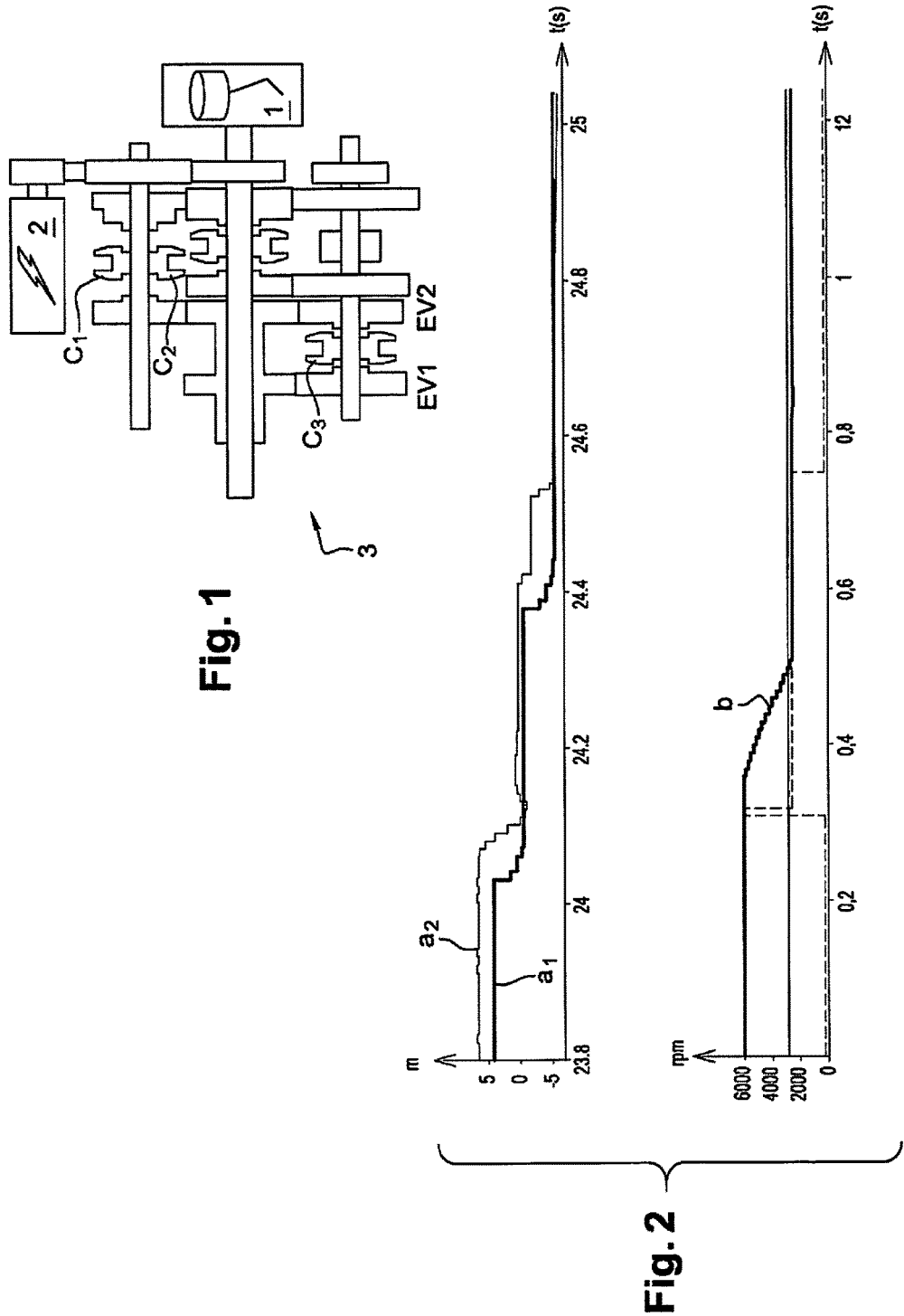

METHOD FOR CONTROLLING THE POSITION OF A GEARBOX ACTUATOR

CROSS-REFERENCE TO RELATED APPLICATIONS

This application is a U.S. National stage application of International Application No. PCT/FR2016/051438, filed on Jun. 15, 2016, which claims priority to French Patent Application No. 1,556,429, filed on Jul. 7, 2015.

BACKGROUND

Field of the Invention

The present invention relates to the monitoring of gearboxes, particularly hybrid gearboxes with dog clutches, for providing different gearbox ratios using two prime movers, such as a heat engine and an electrical traction machine.

More precisely, it concerns a method for monitoring the position of a gearbox actuator responsible for engaging a ratio at the end of a preliminary phase of synchronization of two shafts of the gearbox by a traction machine whose torque is controlled to bring the difference between the speeds of the two shafts into a range which permits their mechanical coupling.

SUMMARY

This invention is particularly, but not exclusively, applicable to what are known as "dog clutch" gearboxes with shift actuators of the sliding gear type, having no mechanical synchronization means. However, synchronization of the gearbox shafts is essential to enable the dog clutches to be engaged during gear shifting. This requires fine control of the prime movers, to generate a monitored speed difference allowing the dog clutch coupling to take place.

FIG. 1 shows an example of a hybrid powertrain, composed of a heat engine 1, an electrical machine and a parallel shaft gearbox 3 equipped with three shift actuators C1, C2, C3 of the sliding gear type, without mechanical synchronizers. In the case of a shift from the EV1 (low gear) to the EV2 (high gear) ratio, FIG. 2 shows the various steps of the shift. The curves (a1) and (a2) show the setpoint position of the dog clutch and its measured position, respectively. A position beyond 5 mm signifies that the EV1 ratio is engaged. A position below −5 mm signifies that the EV2 ratio is engaged. To shift the ratio, the dog clutch is first put in a neutral position at 0 mm (no ratio engaged). The controller of the electrical machine is then used to make it rotate at a speed permitting the engagement of the EV2 ratio. The speed curve (b) of the electrical machine changes from 6000 r.p.m. to about 2200 r.p.m. during the synchronization. When the speed has been stabilized, the dog clutch is engaged to shift to the EV2 ratio.

To meet the reliability requirement for the mechanism, the disengagement of the dog clutches from the initial ratio must be ensured; otherwise it is impossible to synchronize the electrical machine 2. This is because, if the declutching fails, the synchronization algorithm of the machine would apply a very large torque to the gearbox in an attempt to adjust the engine speed to the synchronization target. In the example of the preceding ratio shift, the machine will generate its minimum torque, which is about −220 Nm (braking torque). If the declutching has failed and the machine is allowed to generate this torque, this will cause undesired deceleration, because the braking torque of the machine is transmitted to the wheel. In the case of reverse shifting (from EV2 to EV1 for example), the failure of the declutching causes undesired acceleration.

The publication FR 2,917,479 discloses a gearbox position sensor for consolidating the engaged ratio information in a control system. This sensor comprises a probe interacting with a target connected to an internal actuating element of the gearbox, such as a sliding gear, to provide an analog signal converted into a digital signal delivering periodic information on whether or not the actuating element is at the dead center position. The monitoring method described in this publication has the drawback of requiring the inclusion of a dedicated position sensor system inside the gearbox, on the shift actuator.

The present invention is intended to secure the neutral position of a hybrid gearbox, without a physical sensor.

For this purpose, it proposes to ensure the convergence of the measured speed on one of the two shafts with a speed observed as a function of the inertia observed on this shaft relative to the expected value as a function of the gearbox actuator, and of an estimate of the torque of the machine. Preferably, the following operations are performed:
- calculating an estimate of the torque actually supplied by the machine,
- updating an observed speed value by using the last observed value of inertia,
- updating the value of the observed inertia as a function of the difference between the measured speed and the observed speed.

BRIEF DESCRIPTION OF THE DRAWINGS

The present invention will be more readily understood from a perusal of the following description of a non-limiting embodiment of the invention, with reference to the appended drawings in which:

FIG. 1 is a diagram of a simplified architecture of a hybrid gearbox,

FIG. 2 shows a pair of graphs with curves that show the synchronization of a gear shift in the gearbox.

DETAILED DESCRIPTION OF EMBODIMENTS

Selected embodiments will now be explained with reference to the drawings. It will be apparent to those skilled in the field from this disclosure that the following descriptions of the embodiments are provided for illustration only and not for the purpose of limiting the invention as defined by the appended claims and their equivalents.

The equation of motion of the shaft to be synchronized is as follows:

$$J\dot{\omega} = T$$

where
J is the inertia of the shaft to be synchronized,
$\dot{\omega}$ is the angular acceleration of the shaft, that is to say the derivative of its rotation speed, and
T is the torque generated on the shaft by the electrical machine.

The calculation unit of the powertrain is provided with the measurement of the speed of the shaft ω, and that of the synchronization setpoint torque T. These data are used to monitor the position of a gearbox actuator responsible for engaging a ratio at the end of a preliminary phase of synchronization of two shafts of the gearbox by a traction machine whose torque is controlled to bring the difference between the speeds of the two shafts into a range which permits their mechanical coupling.

Figure 3:
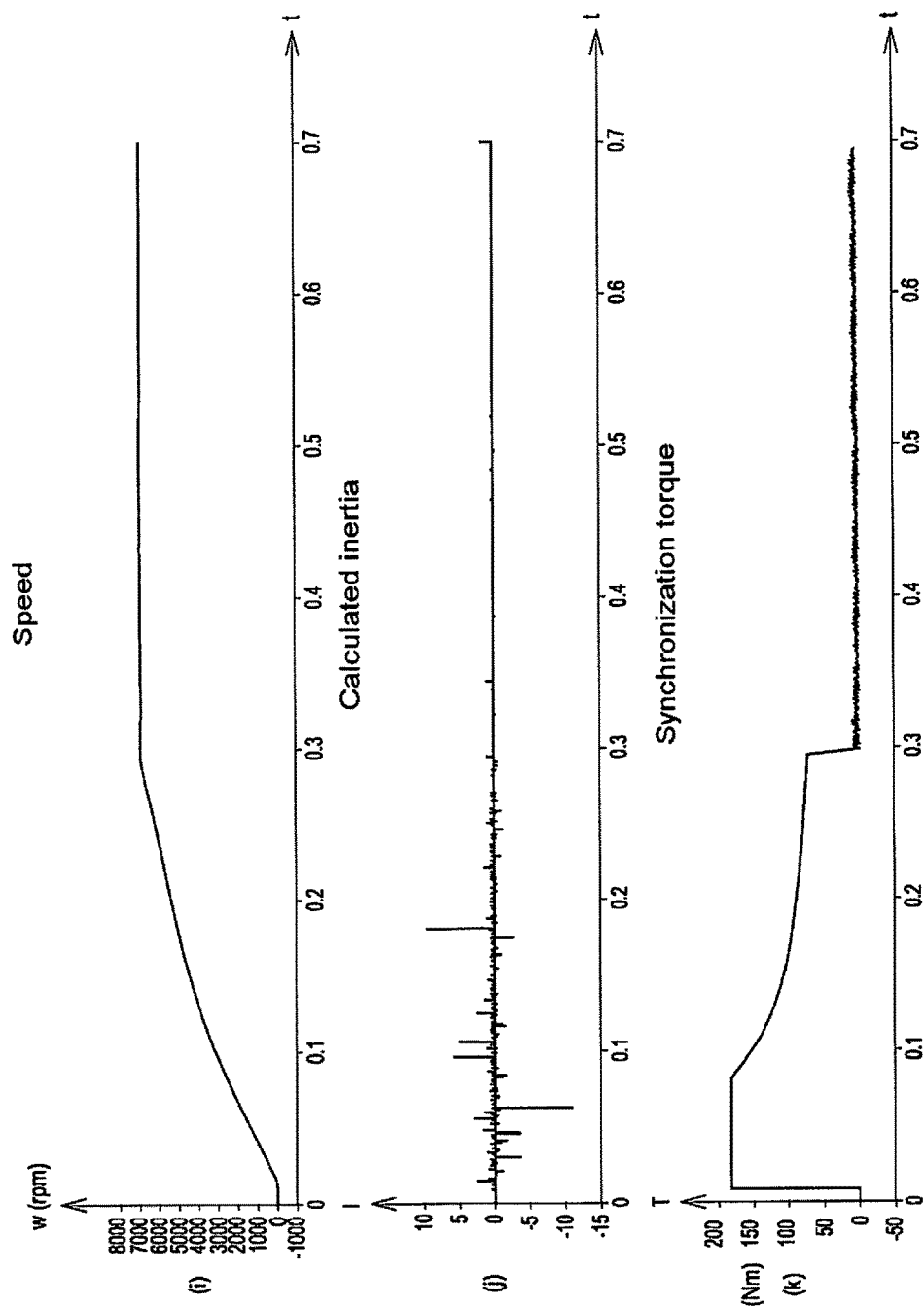
FIG. 3 shows the results of a first calculation method, FIG. 4 explains schematically the operation of the invention, FIG. 5 specifies the method of updating the inertia.

As mentioned above, the proposed solution for securing the neutral position of a hybrid gearbox is based on an estimation of the inertia of the shaft of the gearbox to be secured. A first mode of monitoring the inertia of the shaft consists in calculating its acceleration by derivation of the speed measurement, then estimating the inertia by dividing the setpoint torque by the acceleration thus calculated. FIG. 3 shows the results obtained by this method for a specific example. The curves which are reproduced are as follows:
- the variation of the speed ω along the curve (curve i)
- the direct calculation of the inertia J by the method (curve j), and
- the setpoint synchronization torque T in the lowest figure (curve k).

Because of the "noise" in the speed measurement, the derivative operation introduces such large errors that this method cannot provide a precise estimate of the inertia, even if low-pass filters are added in an attempt to smooth the estimation. For the estimation of the inertia, the performance of this simple method is not high enough to be acceptable.

The invention proposes another method for providing a fine estimate of the inertia which is unaffected by the noise level in the measurement, since it does not use any derivation operation which might amplify the noise, but only uses integration operations which filter out the noise. The method consists in using an observer of the shaft speed, while adjusting the inertia value so as to make the measured speed coincide with the observed speed. According to the invention, it is ensured that the measured speed on one of the two shafts converges with a speed observed as a function of the inertia observed on this shaft relative to the expected value as a function of the gearbox actuator, and of an estimate of the torque of the machine. This method is particularly useful for monitoring the shift to neutral of a gearbox actuator during a change of ratio, but may be used in similar conditions for monitoring other positions of the actuator without departing from the scope of the invention.

Figure 4:
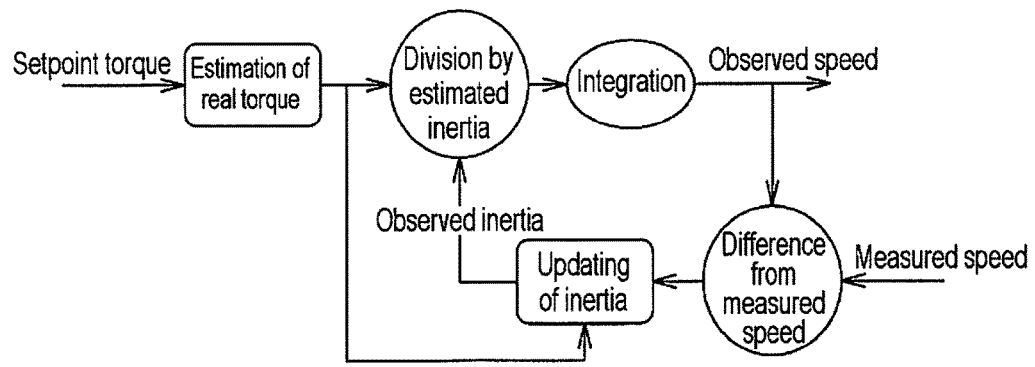

The operation is as shown in FIG. 4. The unit for estimating the real torque is a simple low-pass filter on the torque setpoint, representing the response time of the torque control of the electrical machine. The estimate of the real torque is divided by the estimated inertia, and the "observed speed" is the integrated term of this ratio. The inertia is updated on the basis of the difference between the value of the "observed speed" and the measured speed, and on the basis of the estimation of the real torque, in the inertia updating unit.

Figure 5:
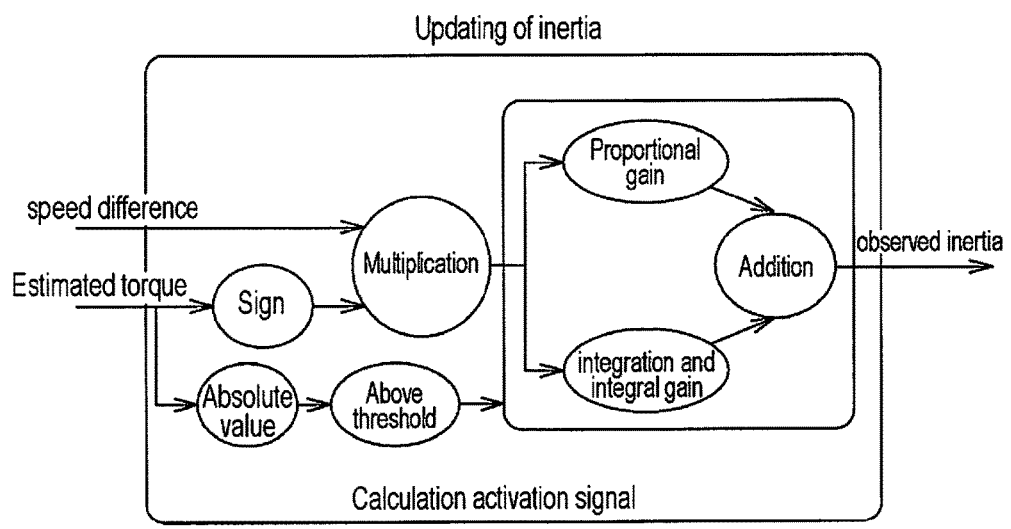

The inertia is updated in the last-mentioned unit according to the diagram of FIG. 5, in an inertia controller, in response to an activation signal. This signal is delivered if the absolute value of the estimated torque is above a threshold. The "observed inertia" is calculated in the controller on the basis of the product of the speed difference and the estimated torque. It is the sum of a proportional gain and an integral gain (found by integration) on this product.

The steps of calculation are therefore as follows:
- calculating the estimate of the torque actually supplied by the machine, for example by filtering the setpoint obtained from the synchronization algorithm,
- updating the observed speed by using the last observed value of inertia,
- updating the value of the observed inertia as a function of the difference between a measured speed and an observed speed.

The latter update may be performed subject to the condition that the setpoint torque is large enough to lead to a change of speed. The accepted speed threshold is, for example, about 5 Nm for a machine that can supply up to 220 Nm. The observed speed is preferably found by integration of the estimated real torque, divided by the last observed value of inertia.

This sequence of operations may be reproduced on each update of the speed measurement and of the synchronization torque. In this procedure, the inertia of the gearbox to be synchronized is monitored by ensuring the convergence of the measured speed on one of the two shafts with a speed observed as a function of the value of the inertia observed on this shaft and of an estimate of the torque of the machine.

Figure 6:
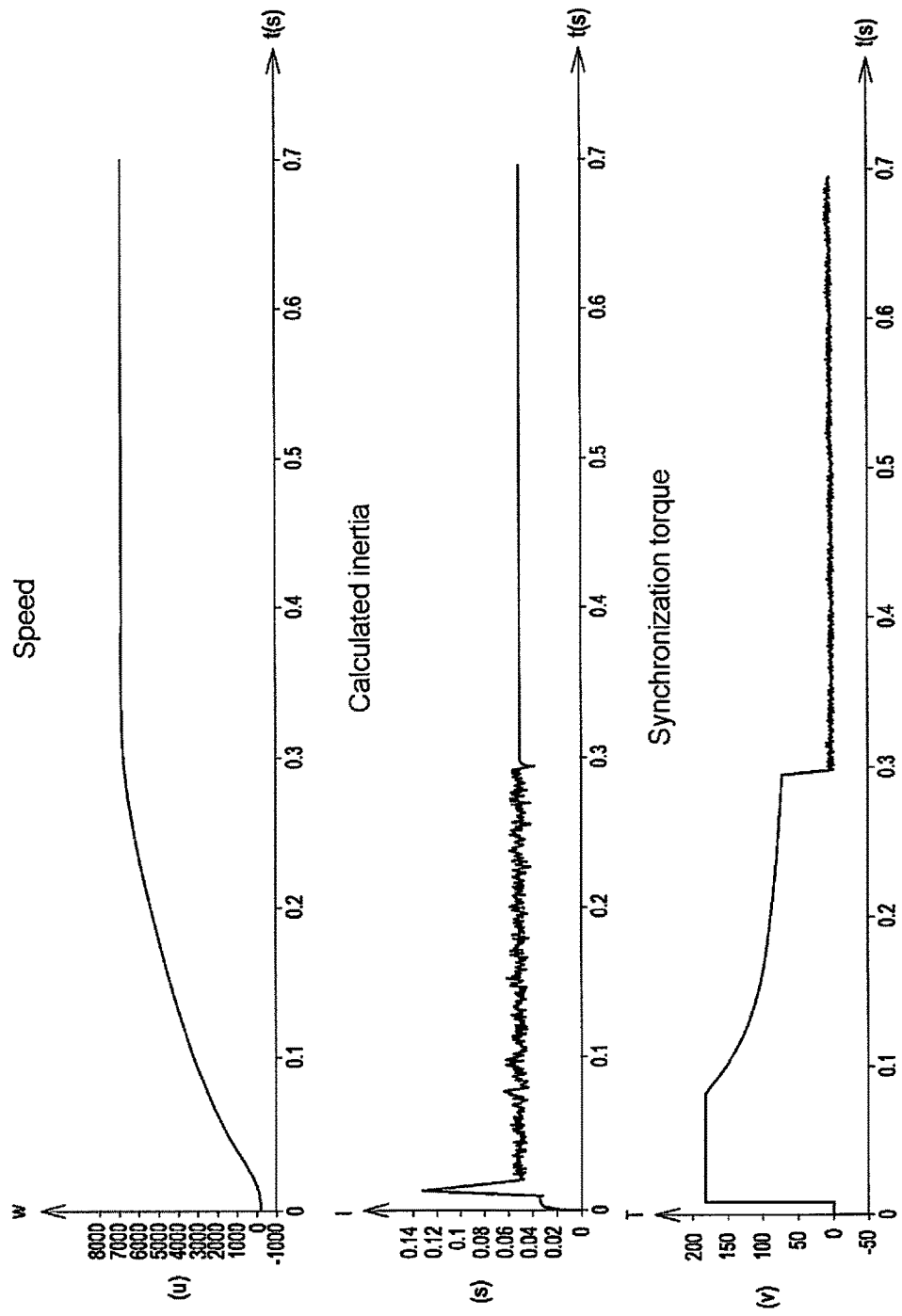
FIG. 6 shows three curves resulting from the use of the invention in the nominal case.
Figure 7:
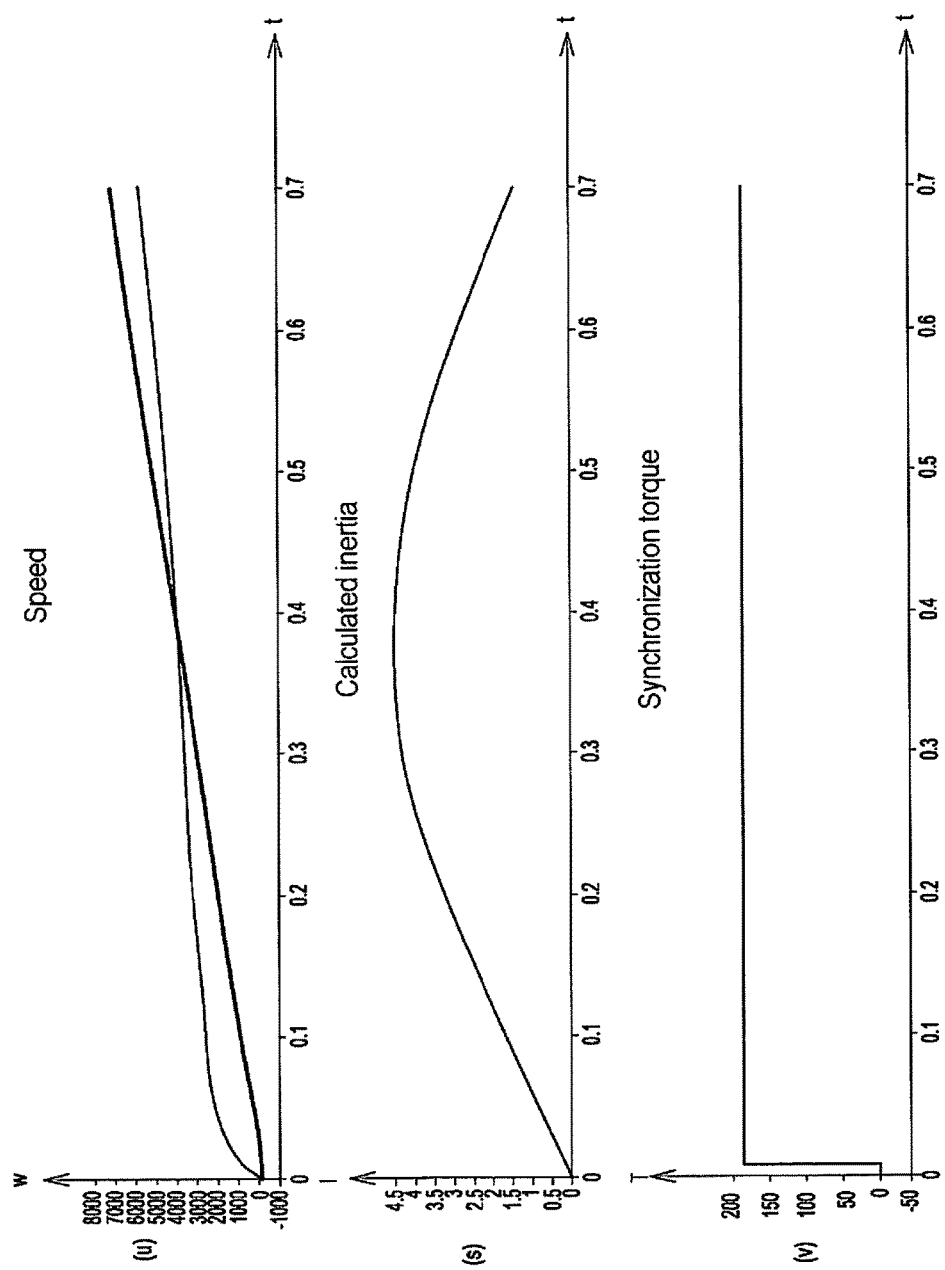
FIG. 7 shows three curves resulting from the use of the invention in the case of a declutching failure.

The results obtained by the use of the method are illustrated by the curves in FIGS. 6 and 7. FIG. 6 represents the application of the method in a normal operating situation of the shift actuator (without any failure of the dog clutch coupling). The first curve (u) superimposes the measured and observed speeds, the observer ensuring the convergence of the observed speed toward the measured speed. The second curve (s) shows the variation of the observed inertia J. The final curve (t) shows the variation of the synchronization setpoint torque T.

The curves (u), (s), (y) of FIG. 7 correspond to those of FIG. 6, and represent a failure of declutching, because the observed inertia exceeds the threshold of 900 gm$^2$ in about 50 ms. In this situation, if the synchronization sequence is halted after only 50 ms, the driver does not sense the torque supplied to the wheel in this small time interval. By halting the sequence, it is possible to avoid the undesired accelerations and decelerations which would normally be sensed when there is a failure of declutching.

To ensure that the synchronization takes place in nominal conditions, the invention proposes to introduce an "inertia observer" of the machine, which performs the synchronization, into the controller. During the control procedure in normal conditions, the inertia on the shaft must normally be limited to that of the machine (because the dog clutch is in the neutral position), which is about 50 gm$^2$. However, if declutching has failed, the inertia of the vehicle converted to that of the machine results in an equivalent inertia of about 1 kgm$^2$. If the inertia on line is estimated according to the invention, the synchronization may be halted as soon as the observed inertia exceeds a threshold (of 900 gm$^2$ for example, in the example described).

To summarize, the proposed method consists of a series of operations for reliably detecting any failures of the gearbox actuators, and for securing the gear shifts, if the declutching fails, by using a virtual "inertia controller" which adds a proportional gain and an integral gain on the product of the speed difference and the estimated torque. This operation ensures that the gearbox has a high level of performance. In the exemplary embodiment described, the controller can detect a failure of the actuator, in the case of a variation of a ratio of 20 between the predicted inertia and the observed inertia.

It has also been found that the precision of the estimation is sufficient to provide other functions, such as:
  checking the decoupling of the heat engine, by observing that the inertia has decreased, or
  ensuring that a new gear has been engaged, on the basis of a change in the inertia of the vehicle converted to that of the engine.

The invention claimed is:

1. A position monitoring method for monitoring a position of a gearbox actuator responsible for engaging a ratio at an end of a preliminary phase of synchronization of two shafts of a gearbox by a electrical machine whose torque is controlled to bring a difference between speeds of the two shafts into a range which permits mechanical coupling of the two shafts, the position monitoring method comprising:
  monitoring neutral shifting of the gearbox actuator during a change of ratio, and
  ensuring a convergence of a measured speed on one of the two shafts with an observed speed as a function of a value of observed inertia on the one of the two shafts relative to an expected value as a function of the gearbox actuator by using an estimate of an estimated torque of the electrical machine.

2. The position monitoring method as claimed in claim 1, further comprising
  calculating the estimate of the torque actually supplied by the electrical machine,
  updating a speed value observed by using a last observed value of inertia, and
  updating the value of the observed inertia as a function of a speed difference between the measured speed and the observed speed.

3. The position monitoring method as claimed in claim 2, wherein
  the updating of the inertia is performed subject to a condition that a setpoint torque of the electrical machine is large enough to lead to a significant change of speed.

4. The position monitoring method as claimed in claim 3, wherein
  the updating of the inertia is carried out in an inertia controller by adding a proportional gain and an integral gain on a product of the speed difference and the estimated torque.

5. The position monitoring method as claimed in claim 3, wherein
  a speed threshold is about 5 Nm for the electrical machine that can supply up to 220 Nm.

6. The position monitoring method as claimed in claim 2, wherein
  the estimate of the torque actually supplied by the electrical machine is calculated by filtering the value of a setpoint torque of the electrical machine.

7. The position monitoring method as claimed in claim 1, wherein
  the observed speed is found by integration of the estimated torque, divided by a last observed value of inertia.

* * * * *